United States Patent
Nabekura et al.

(10) Patent No.: US 6,616,827 B2
(45) Date of Patent: Sep. 9, 2003

(54) FILTRATION METHOD OF COPPER ELECTROLYTE

(75) Inventors: Kazuyoshi Nabekura, Ageo (JP); Yutaka Hirasawa, Ageo (JP); Naotomi Takahashi, Ageo (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 09/838,321

(22) Filed: Apr. 20, 2001

(65) Prior Publication Data
US 2001/0042688 A1 Nov. 22, 2001

(30) Foreign Application Priority Data
May 18, 2000 (JP) .................................. 2000-145923

(51) Int. Cl.$^7$ .............................................. C25D 21/18
(52) U.S. Cl. .................... 205/99; 210/777; 210/660; 210/691
(58) Field of Search .................... 205/99; 210/777, 210/660, 691

(56) References Cited

U.S. PATENT DOCUMENTS 4,238,334 A * 12/1980 Halbfoster ................ 210/679
4,420,401 A * 12/1983 Kretas et al. .............. 75/740
5,047,123 A * 9/1991 Arvanitakis ................ 202/170

OTHER PUBLICATIONS

PCT Search Report Publication No. WO 01/87459 for related application No. PCT/JP01/03440 published Nov. 22, 2001.*

* cited by examiner

Primary Examiner—Roy King
Assistant Examiner—Wesley A. Nicolas
(74) Attorney, Agent, or Firm—Rothwell, Figg, Ernst & Manbeck, P.C.

(57) ABSTRACT

The present invention provides a filtration method of copper electrolyte that can remove minute electrolytic by-products and dirt and may improve filtration efficiency by improving a conventional filtration method, the so-called precoating method. In a filtration method of copper electrolyte for removing electrolytic by-products and dirt which affect copper electrolysis, by passing copper electrolyte through a filter element precoated with a filtering aid, in the present invention, a precoated layer of a filtering aid is formed on a filter element in advance. Activated carbon preliminary treatment solution containing powdery activated carbon is passed through the filter element formed with the precoated layer, and is also circulated until no powdery activated carbon leaks from an outlet of the filter element, thus forming a powdery activated carbon layer on the precoated layer. Subsequently, the copper electrolyte is passed through for filtration.

5 Claims, 2 Drawing Sheets

FILTRATION METHOD OF COPPER ELECTROLYTE

TECHNICAL FIELD

The present invention relates to a filtration method of copper electrolyte, and particularly, relates to a technique to improve filtration treatment efficiency with powdery activated carbon.

BACKGROUND ART

It has been conventionally known that electrolytic by-products and dirt in copper electrolyte have significant effects on physical and other properties of electrodeposits obtained by an electrolytic treatment in copper plating, copper electroforming, and so forth. Accordingly, such unnecessary electrolytic by-products and dirt in copper electrolyte are removed by a filtration method, a so-called precoating method with a filtering aid.

In this precoating method, a filtering aid such as diatomaceous earth and pearlite is precoated to a filter element such as filter cloth and a metallic screen. Copper electrolyte is passed thereto, thus depositing electrolytic by-products and dirt in the electrolyte to a surface of a precoated layer as filter cake, for removal. Filtration may be performed highly efficiently without clogging over a long period, and is extremely convenient even when a large volume of electrolyte is treated, so that this filtration method is widely used. The method also has an advantage in that filtration may be performed in accordance with the size and so forth of an object to be removed by appropriately selecting the type, particle size and so forth of a filtering agent.

However, this precoating method has a limitation on filtering minute electrolytic by-products and dirt of 0.5 μm or less. Also, in removing minute electrolytic by-products and so forth by reducing the particle size of a filtering agent, filtration efficiency sharply declines; in other words, permeation of electrolyte worsens, which is not practically preferable.

As a method to efficiently remove such minute electrolytic by-products and dirt, a filtration method with activated carbon is known. Since activated carbon has an excellent adsorption property, it is suitable for filtering and removing minute electrolytic by-products and so forth. Moreover, when copper electrolyte is treated with activated carbon, the physical property of obtained copper electrodeposits may be controlled, so that activated carbon is often used in a copper electrolytic plating.

As the filtration method with activated carbon, a so-called granular activated carbon having the particle size of about 5 to 60 mesh (2 to 0.25 mm) is filled in a cylindrical treatment column provided with a perforated plate inside, and copper electrolyte is passed through the treatment column for treatment. According to the filtration method with activated carbon, minute electrolytic by-products and dirt may be removed. However, as the electrolyte is continuously passed through, the activated carbon in the treatment column forms sections so that the electrolyte may easily pass through, generating a so-called biased flow, and contact between the granular activated carbon and the copper electrolyte becomes insignificant. Moreover, since activated carbon of a large particle size is used, a contact area with copper electrolyte is small, so that filtration efficiency is not considered satisfactory.

Therefore, in order to make the filtration treatment with activated carbon reliable, a great amount of activated carbon had to be filled in to extend contact time between copper electrolyte and activated carbon. This would lead a cost increase in a copper electrolytic plating, and it is not preferable since the treatment volume of electrolyte increases. Moreover, as a method to increase contact area between copper electrolyte and activated carbon of a small particle size, a so-called powdery activated carbon may also be considered for use. In this case, it is ideal to use activated carbon of a smaller particle size in order to enlarge a contact area. However, as a particle size becomes smaller, powdery activated carbon is likely to be mixed into copper electrolyte, and the mixed powdery activated carbon provides effects on the quality of copper electrodeposits. Moreover, in case of powdery activated carbon, unlike granular activated carbon, it is difficult to fill the powdery activated carbon in a treatment column provided with a perforated plate and to continuously let copper electrolyte pass through, for an application. Thus, a batch processing method has to be taken. This is not preferable as an application to a step for a continuous copper electrolytic plating.

DISCLOSURE OF THE INVENTION

The present invention is made under the above-noted circumstances as a background, and is to provide a filtration method of copper electrolyte that can remove minute electrolytic by-products and dirt and may also significantly improve filtration efficiency by improving a conventional filtration method, the so-called precoating method.

In order to solve the problems, in a filtration method of copper electrolyte to remove electrolytic by-products and dirt which affect copper electrolysis, by passing the copper electrolyte through a filter element precoated with a filtering aid, in the invention, a precoated layer of a filtering aid is formed on a filter element in advance. Activated carbon preliminary treatment solution containing powdery activated carbon is passed through the filter element formed with the precoated layer, and is also circulated until no powdery activated carbon leaks from an outlet of the filter element, thus forming a powdery activated carbon layer on the precoated layer. Subsequently, copper electrolyte is passed through for filtration.

According to the present invention, minute electrolytic by-products and dirt contained in copper electrolyte may be surely removed for filtration without mixing powdery activated carbon into copper electrolyte. Moreover, as powdery activated carbon is used, a contact surface area of the activated carbon sharply increases. A flow velocity may be reduced even at a large flow rate in volume. A long contact time may be ensured, and filtration efficiency may sharply improve.

A characteristic of the present invention is to form a powdery activated carbon layer further on a precoated layer by circulating the activated carbon preliminary treatment solution containing powdery activated carbon. The precoated layer of the filtering aid formed on the filter element has fine mesh, a so-called strainer, to let copper electrolyte pass through. However, in the present invention, powdery activated carbon is deposited on the strainer formed of the filtering aid, and the powdery activated carbon layer is formed on the precoated layer finally. When powdery activated carbon is passed through the precoated layer, a phenomenon is initially seen in which most of the powdery activated carbon passes through the precoated layer and leaks out from an outlet of the filter element. However, as the circulation is being repeated, the powdery activated carbon gradually fills up the strainer of the precoated layer and finally stops leaking therefrom. As the circulation is further repeated, a powdery activated carbon layer through which only solution can pass is formed on the precoated layer.

The filtering aid relating to the present invention may be a commonly known filtering aid. For instance, diatomaceous earth, pearlite, cellulose, and so forth may be used. Moreover, a filter element relating to the present invention may be filter cloth and a metallic screen, or other porous elements as long as a filtering aid may be precoated thereto and solution can pass through it by adding pressure to the solution. Additionally, the activated carbon preliminary treatment solution relating to the present invention is not particularly limited in its composition. For instance, copper electrolyte as a filtering object may be directly used, and the copper electrolyte may be diluted for use. In short, in case of filtering by passing copper electrolyte after a powdery activated carbon layer is formed, any treatment solution may be used as long as the activated carbon preliminary treatment solution provides no effects on a copper electrolytic plating by being mixed into the copper electrolyte.

In the filtration method of copper electrolyte relating to the present invention, filtration efficiency may improve further if a precoated layer and a powdery activated carbon layer are alternately deposited. In this case, a precoated layer is formed as the lowermost layer, and a powdery activated carbon layer and, moreover, a precoated layer may be sequentially deposited thereon. The number of layers and the thickness thereof may be appropriately decided in consideration of filtration efficiency, in other words, passage of copper electrolyte, and size, type, quantity and so forth of electrolytic by-products and dirt being removed.

The powdery activated carbon for use in the filtration method of copper electrolyte relating to the present invention is preferably the one having 50 mesh (0.287 mm) or less in particle size, and more preferably the one having 50 to 200 mesh (0.074 to 0.287 mm) in particle size. The powdery activated carbon having 50 mesh or less particle size is powdery activated carbon that can pass through standard screen of 50 mesh. With powdery activated carbon of larger than 50 mesh in particle size, a surface area of an individual activated carbon particle becomes small, and filtration efficiency does not improve much. Moreover, in consideration of filtration efficiency, costs and so forth, 70 to 170 mesh activated carbon is preferable for actual operations. A term, powdery activated carbon, in the present invention is used above and below for not only the so-called powdery activated carbon but also granular activated carbon obtained by crushing or granulation.

Additionally, the thickness of a powdery activated carbon layer formed by the filtration method of copper electrolyte relating to the present invention is preferably 2 to 20 mm. When it is less than 2 mm, the removal of minute electrolytic by-products and dirt tends to become incomplete. When it is thicker than 20 mm, filtration efficiency, in other words, the passage of copper electrolyte becomes poor, and it is also undesirably costly.

Moreover, the filtering aid for use in the present invention is made of diatomaceous earth of 3 to 40 μm particle size. It is preferable to use the filtering aid in which diatomaceous earth of 3 to 15 μm particle size is mixed with diatomaceous earth of 16 to 40 μm particle size at the ratio of 7:3. By applying diatomaceous earth with the mixture of such particle sizes and mixing ratios, a powdery activated carbon layer may be easily formed, and filtration efficiency may improve significantly.

According to the filtration method of copper electrolyte of the present invention described above, when electrolytic plating are carried out with additives, for instance, organic matters such as glue and gelatin, cellulose, ether, thiourea and so forth, to control the physical property of copper electrodeposits, decomposition products of the additives may be efficiently removed, and clean copper electrolyte may be reproduced. Generally, these additives are frequently decomposed by being added to copper electrolyte or by an electrolytic treatment, and the decomposition products become extremely minute. The decomposition products tend to affect the physical and other properties of copper electrodeposits when decomposition products are left in a large quantity in electrolyte. However, according to the present invention, even if the additives are added to continue a copper electrolytic plating, copper electrodeposits having constant physical property may be manufactured with stability.

BEST MODE FOR CARRYING OUT THE INVENTION

An embodiment of the present invention will be explained below. Copper sulfate electrolyte is used to manufacture an electrolytic copper foil as an example for explanation in the embodiment.

Figure 1:
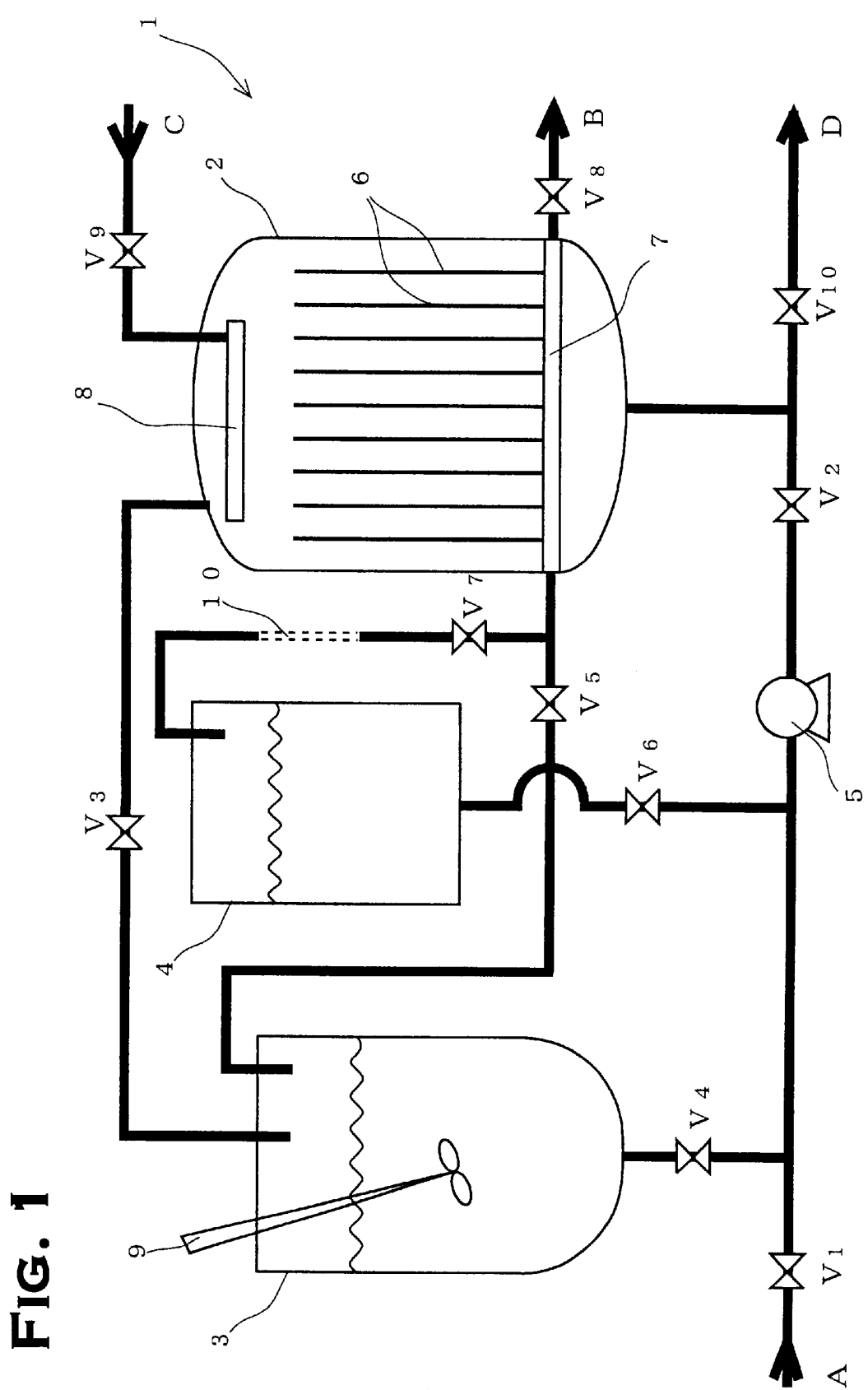
FIG. 1 is a schematic view of a filtration device according to the embodiment.

FIG. 1 is a schematic view of a filtration device relating to the embodiment. This filtration device 1 is provided with a filtration tank 2, a precoating tank 3, an activated carbon preliminary treatment tank 4, a solution feeding pump 5; and each is connected by a pipe. Moreover, each pipe is provided with an appropriate valve (V1 to V10). The copper sulfate electrolyte as a filtering object is introduced from an untreated solution inflow port A into the filtration device 1. The copper sulfate electrolyte filtered at the filtration tank 2 is transported from a filtrate outflow port B to an electrolytic copper foil manufacturing device not shown in the figure.

This filtration tank 2 is the so-called vertical ultra filter type. Stainless wire leaves or strainer 6 covered with corrosion resisting filter cloth are provided in the tank 2 while being connected to a collecting pipe 7. The copper sulfate electrolyte flowing into the filtration tank 2 is collected at the collecting pipe 7 after passing through the strainer 6. The electrolyte is then transported to pipes linked to the precoating tank 3 and the activated carbon preliminary treatment tank 4 and a pipe linked to the filtrate outflow port B. Moreover, a shower 8 for cleaning is provided above the strainer 6 in the filtration tank 2.

Figure 2:
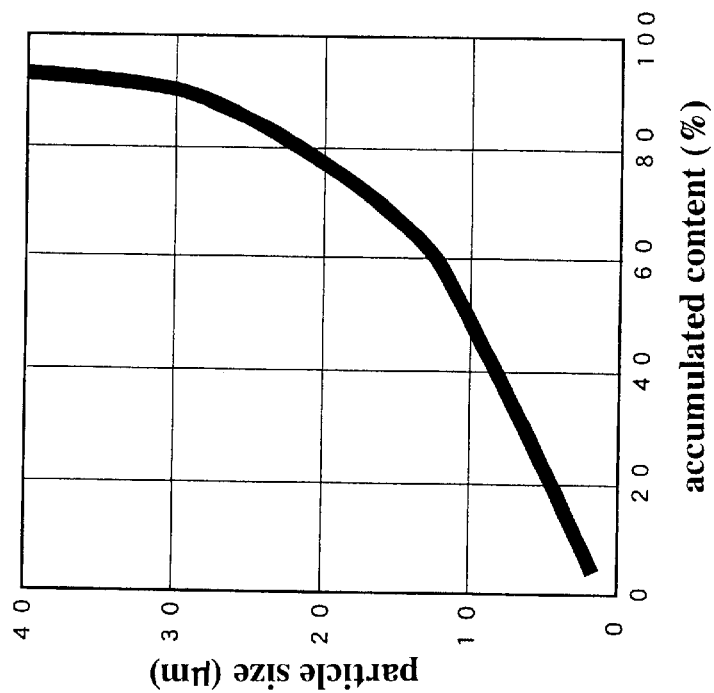
FIG. 2 is a particle size distribution graph of High-Flow Super Cell.

For a filtering aid, diatomaceous earth, a so-called High-Flow Super Cell (trade name: Celite manufactured by Johns Mansville International, Inc.), is used. As diatomaceous earth for a filtering aid, the ones of various trade names such as Radiolite, Gemlite, Dicalite, and so forth may be used. However, among them, the grade of so-called High-Flow Super Cell, was used. This High-Flow Super Cell has a particle size distribution shown in FIG. 2. It is made of diatomaceous earth of 3 to 40 μm particle size, which is formed by mixing diatomaceous earth of 3 to 15 μm particle size and diatomaceous earth of 16 to 40 μm particle size approximately at the ratio of 7:3.

Moreover, the powdery activated carbon is activated carbon having 80 mesh or less particle size, and contains activated carbon of 100 mesh or less particle size at 95% or more. Furthermore, the activated carbon preliminary treatment solution was prepared by using copper sulfate electrolyte diluted with De-ionized water and adding powdery activated carbon thereto.

Precoating is performed in the following procedure at the filtration device 1 shown in the embodiment. First, the liquid feeding pump 5 is driven to introduce copper sulfate electrolyte from the untreated solution inflow port A through a route of V1→solution feeding pump 5→V2→filtration tank2→V3→precoating tank 3. A predetermined amount of copper sulfate electrolyte is filled into the precoating tank 3. Then, the above-noted High-Flow Super Cell is introduced to the precoating tank 3, and is subsequently circulated through a route of precoating tank 3→V4→solution feeding pump 5→V2→filtration tank 2→V3 and is dispersed in the copper sulfate electrolyte to which the High-Flow Super Cell is added. In this case, when the High-Flow Super Cell is to be dispersed faster and with certainty, an agitator 9 provided at the precoating tank 3 is used. A precoated layer is formed by circulating solution in which the High-Flow Super Cell is dispersed, through a route of precoating tank 3→V4→solution feeding pump 5→V2→filtration tank 2→strainer 6→collecting pipe 7→V5, and depositing the High-Flow Super Cell on a surface of the filter cloth at the strainer 6.

After a precoated layer is formed at a predetermined thickness, activated carbon preliminary treatment solution to which the powdery activated carbon mentioned above was preliminarily mixed, is circulated through a route of activated carbon preliminary treatment tank 4→V6→solution feeding pump 5→V2→filtration tank 2→strainer 6→collecting pipe 7→V7 to form a powdery activated carbon layer. In this case, circulating solution is visually observed at a transparent pipe section 10 formed of a transparent material provided near V7 to make sure if the powdery activated carbon is not leaking through the precoated layer, filter cloth and leaves. When the powdery activated carbon is leaking, the circulating diluted copper sulfate is observed in cloudy black. As the leak decreases, the cloudiness of liquid decreases and transparent blue color solution may be observed at the end.

Figure 3:
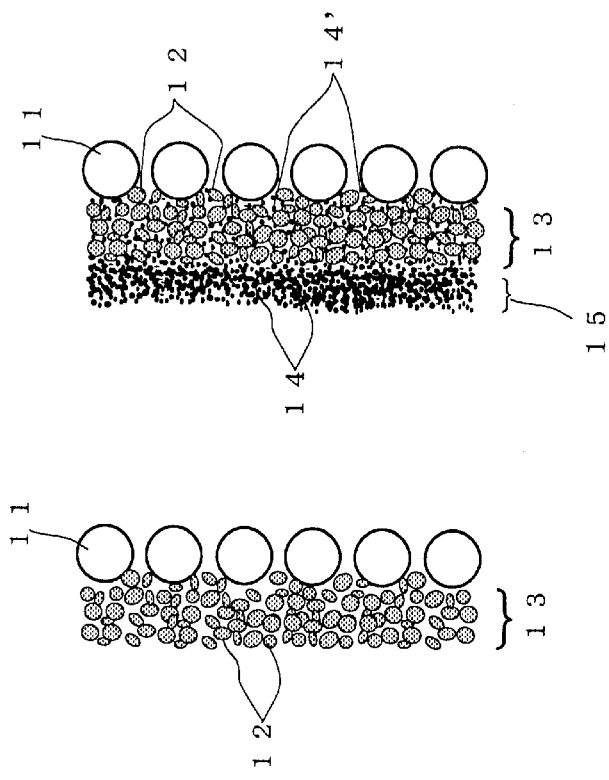
FIG. 3 is conceptual cross sections of a precoated layer and a powdery activated carbon layer.

FIG. 3 shows conceptual typical views of cross sections of a precoated layer and a powdery activated carbon layer which are formed as mentioned above. As shown in FIG. 3(A), a precoated layer 13 of diatomaceous earth 12 is formed on a surface of filter cloth fibers 11. Subsequently, by circulating activated carbon preliminary treatment solution, the powdery activated carbon layer 15 of the powdery activated carbon 14 is formed on a surface of the precoated layer 13 as shown in FIG. 3(B). Right after the activated carbon preliminary treatment solution starts circulating, the activated carbon passes between individual particles of the diatomaceous earth 12 and leaks as shown in FIG. 3(A). However, as the circulation is being repeated, more powdery activated carbon adheres to the particles of the diatomaceous earth 12 like powdery activated carbon 14' shown in FIG. 3(B). The amount of leaking powdery activated carbon gradually decreases, and the powdery activated carbon layer 15 is formed.

After no leakage of powdery activated carbon is confirmed, copper sulfate electrolyte as a filtering object is introduced from the untreated solution inflow port A. The copper sulfate electrolyte is then filtered through a route of V1→solution feeding pump 5→V2→filtration tank 2→strainer 6→collecting pipe 7→V8→filtrate outflow port B.

In alternately forming a precoated layer and a powdery activated carbon layer, the precoated layer 12 may be further formed on the powdery activated carbon layer 14 shown in FIG. 3(B). In this case, the precoated layer 12 is formed by the same method as previously explained, and the explanation is omitted.

By a predetermined filtration treatment, electrolytic by-products and dirt contained in copper sulfate electrolyte are deposited as filter cake. Then, when the solution feeding volume of copper sulfate electrolyte decreases to a predetermined level, the filter cake will be discharged. In this case, the copper sulfate electrolyte as a filtering object is stopped from feeding. De-ionized water is introduced through a route of wash water inlet C→V9→shower 8. Rinsing water is ejected from the shower 8 to discharge the filter cake. The rinsing water is drained through a channel of V10→drain outlet D.

Subsequently, an example will be explained, regarding the data relating to filtration efficiency in the present embodiment. When a total application amount of powdery activated carbon (about 0.35 to $0.5 \times 103$ kg/m$^3$ in density) is 300 kg with a filtration tank capacity of 6 m$^3$ and a total strainer surface area of 60 m$^2$, a powdery activated carbon layer is about 10 to 15 mm in thickness. When a flow rate of copper sulfate electrolyte as a filtering object is 3 m$^3$/min., the time for sulfate copper electrolyte to pass through the powdery activated carbon layer is about 10 to 20 seconds (flow velocity of 0.8 mm/sec.).

On the other hand, even in case of using conventional granular activated carbon for a treatment, 300 kg of granular activated carbon (40 mesh particle size) is filled into a cylindrical treatment column (1.5 m high×0.7 m cylinder diameter, 0.6 m$^3$ capacity). In case of feeding at the flow rate of 3 m$^3$/min., a liquid-passing rate is 7.8 m/min., and passing time is 11.6 seconds and equivalent. In considering a chance of contacting solution to activated carbon herein, granular carbon has larger particle spaces therebetween than powdery carbon. Accordingly, a granular carbon surface is less likely to be in contact with solution. In other words, even if contact time is practically equivalent, the present embodiment using powdery activated carbon has longer actual contact time that is equivalent to filtration efficiency, than the case with conventional granular activated carbon.

Finally, the effects will be explained when a copper foil is continuously manufactured by an electrolytic copper foil manufacturing device using a rotating drum in the filtration method of the embodiment mentioned above. In the manufacture of an electrolytic copper foil, the physical property of the obtaining electrolytic copper foil is controlled by adding glue to copper sulfate electrolyte. When a copper foil is manufactured by using conventional granular activated carbon, the decomposition products of glue and the like are concentrated more in the copper sulfate electrolyte, and the time to exchange activated carbon, filtering aid and so forth was about 10 days. On the other hand, when the filtration method of this embodiment was used with a manufacturing device of the same scale, the exchange of activated carbon, filtering aid and so forth was unnecessary up until about the 30th day. An electrolytic copper foil of identical properties was successfully manufactured with stability.

Furthermore, thiourea was used as an additive to control surface smoothness as a property of an electrolytic copper foil, so as to manufacture an electrolytic copper foil. In a conventional filtration method, when thiourea is added to copper sulfate electrolyte for manufacture, an electrolytic copper foil with a smooth surface may be initially obtained.

However, after a certain period, a phenomenon was found in which the smoothness cannot be kept. However, in case of the filtration method of the present embodiment, it was found that decomposition products of thiourea may be fully caught, and that an electrolytic copper foil with a smooth surface may be continuously manufactured.

INDUSTRIAL APPLICABILITY

As explained above, according to the present invention, minute electrolytic by-products and dirt may be removed from copper electrolyte, and filtration efficiency may improve significantly. Accordingly, even if various types of additives are introduced to copper electrolyte to control properties of copper electrodeposits, copper electrodeposits having stable properties may be continuously manufactured.

What is claimed is:

1. A copper electrolyte filtration method for removing electrolytic by-products and dirt which affect copper electrolysis by passing copper electrolyte through a filter element precoated with a filtering aid, wherein the filtration method comprises the steps of:

forming a precoated layer of a filtering aid on a filter element in advance of passing the copper electrolyte through the filter element;

thereafter forming a powdery activated carbon layer on the precoated layer by passing activated carbon preliminary treatment solution containing powdery activated carbon through the filter element coated with the precoated layer, and circulating the activated carbon preliminary treatment solution through the coated filter element until no powdery activated carbon leaks from an outlet of the filter element; and subsequently passing the copper electrolyte through the filter element to remove electrolytic by-products and dirt from the copper electrolyte.

2. The filtration method according to claim 1, wherein the precoated layers and the powdery activated carbon layers are alternately deposited to each other.

3. The filtration method according to claim 1, wherein the powdery activated carbon has 50 mesh or less particle size.

4. The filtration method according to claim 1, wherein the powdery activated carbon layer is 2 to 20 mm thick.

5. The filtration method according to claim 1, wherein the filtering aid is made of diatomaceous earth of 3 to 40 $\mu$m particle size, and is formed by mixing diatomaceous earth of 3 to 15 $\mu$m particle size and diatomaceous earth of 16 to 40 $\mu$m particle size at a ratio of 7:3.

* * * * *

UNITED STATES PATENT AND TRADEMARK OFFICE
CERTIFICATE OF CORRECTION

PATENT NO. : 6,616,827 B2
DATED : September 9, 2003
INVENTOR(S) : Nabekura et al.

It is certified that error appears in the above-identified patent and that said Letters Patent is hereby corrected as shown below:

Title page,
Item [*] Notice, should read:
-- Subject to any disclaimer, the term of this patent is extended or adjusted under 35 U.S.C. 154(b) by 65 days. --

Signed and Sealed this

Sixth Day of April, 2004

JON W. DUDAS
*Acting Director of the United States Patent and Trademark Office*